US012536974B2

(12) United States Patent
Nakamura et al.

(10) Patent No.: US 12,536,974 B2
(45) Date of Patent: Jan. 27, 2026

(54) LIQUID CRYSTAL DISPLAY DEVICE FOR SUPPRESSING DETERIORATION OF DISPLAY QUALITY CAUSED BY POLARITY BIAS OF DATA VOLTAGE AND METHOD OF DRIVING THE SAME

(71) Applicant: Sharp Display Technology Corporation, Kameyama (JP)

(72) Inventors: Yousuke Nakamura, Kameyama (JP); Daiji Kitagawa, Kameyama (JP); Daisuke Suehiro, Kameyama (JP); Jin Miyazawa, Kameyama (JP)

(73) Assignee: Sharp Display Technology Corporation, Kameyama (JP)

( * ) Notice: Subject to any disclaimer, the term of this patent is extended or adjusted under 35 U.S.C. 154(b) by 0 days.

(21) Appl. No.: 18/883,182

(22) Filed: Sep. 12, 2024

(65) Prior Publication Data

US 2025/0111834 A1 Apr. 3, 2025

(30) Foreign Application Priority Data

Oct. 2, 2023 (JP) ................................ 2023-171059

(51) Int. Cl.
*G09G 3/36* (2006.01)

(52) U.S. Cl.
CPC ......... *G09G 3/3688* (2013.01); *G09G 3/3614* (2013.01); *G09G 3/3677* (2013.01);
(Continued)

(58) Field of Classification Search
CPC ...... G09G 3/36; G09G 3/3611; G09G 3/3614; G09G 3/3622; G09G 3/3625; G09G 3/364; G09G 3/3644; G09G 3/3648; G09G 3/3655; G09G 3/3659; G09G 3/3674; G09G 3/3677; G09G 3/3681; G09G 3/3685; G09G 3/3688; G09G 3/3692; G09G 3/3696
(Continued)

(56) References Cited

U.S. PATENT DOCUMENTS 9,865,206 B2 * 1/2018 Miyazawa ........... G09G 3/3614
2008/0297457 A1 * 12/2008 Song .................... G09G 3/3648
345/89

(Continued)

FOREIGN PATENT DOCUMENTS

WO 2015/087587 A1 6/2015

*Primary Examiner* — Ke Xiao
*Assistant Examiner* — Nelson Lam
(74) *Attorney, Agent, or Firm* — ScienBiziP, P.C.

(57) ABSTRACT

A drive control circuit that controls operations of liquid crystal drive circuits (a gate driver and a source driver) is provided with a counter that counts a polarity bias value that represents polarity bias of a data voltage applied to liquid crystal capacitance. During a scan frame period in which the polarity bias value is greater than a predetermined upper limit at a start of input of one frame of the image signal, the drive control circuit controls operations of the liquid crystal drive circuits so that the polarity bias value becomes smaller. During a scan frame period in which the polarity bias value is smaller than a predetermined lower limit at the start of input of one frame of the image signal, the drive control circuit controls the operations of the liquid crystal drive circuits so that the polarity bias value becomes larger.

9 Claims, 12 Drawing Sheets

(52) U.S. Cl.
CPC ... *G09G 2310/08* (2013.01); *G09G 2330/021* (2013.01); *G09G 2360/12* (2013.01)

(58) Field of Classification Search
USPC .................................................... 345/87–104
See application file for complete search history.

(56) References Cited

U.S. PATENT DOCUMENTS

2014/0368484 A1* 12/2014 Tanaka ................. G09G 3/3696 345/94
2014/0368492 A1* 12/2014 Fujioka ................ G09G 3/3648 345/214
2015/0138249 A1* 5/2015 Miyata ................. G09G 3/3614 345/89
2015/0235600 A1* 8/2015 Inada ................... G09G 3/3685 345/208
2016/0012789 A1* 1/2016 Miyazawa ........... G09G 3/3648 345/96
2016/0365049 A1 12/2016 Kaisha

* cited by examiner

LIQUID CRYSTAL DISPLAY DEVICE FOR SUPPRESSING DETERIORATION OF DISPLAY QUALITY CAUSED BY POLARITY BIAS OF DATA VOLTAGE AND METHOD OF DRIVING THE SAME

CROSS-REFERENCE TO RELATED APPLICATIONS

This application claims the benefit of priority to Japanese Patent Application Number 2023-171059 filed on Oct. 2, 2023. The entire contents of the above-identified application are hereby incorporated by reference.

BACKGROUND

Technical Field

The following disclosure relates to a liquid crystal display device that performs pause drive, and a method of driving the liquid crystal display device.

A liquid crystal display device that includes a display portion including a plurality of source bus lines (image signal lines) and a plurality of gate bus lines (scanning signal lines) has been known. Pixel forming sections that form pixels are provided at intersections of the source bus lines and the gate bus lines. Each of the pixel forming sections includes a thin film transistor (TFT) serving as a switching element, in which a gate terminal is connected to a gate bus line passing through a corresponding intersection and a source terminal is connected to a source bus line passing through the corresponding intersection, liquid crystal capacitance configured to hold a data voltage, and the like. Such liquid crystal display devices are used in various electronic devices such as television receivers, in-vehicle displays such as car navigation devices, notebook computers, and portable terminals such as smartphones and tablet terminals.

In recent years, there has been an increasing demand for low power consumption in liquid crystal display devices. General liquid crystal display devices of the related art are driven at a drive frequency (frame frequency) of 60 Hz. However, the higher the drive frequency becomes, the larger the power consumption becomes, and thus techniques for reducing a drive frequency are actively being developed in order to reduce power consumption. As such a technique, there is known a technique referred to as "pause drive" in which a pause frame period during which a writing operation of a data voltage to liquid crystal capacitance is paused is provided. In a liquid crystal display device that adopts pause drive, there is no need to provide control signals or the like to liquid crystal drive circuits (a gate driver and a source driver) during a pause frame period. Thus, an overall drive frequency of the liquid crystal drive circuits is reduced, thereby enabling lower power consumption. The pause drive is also referred to as "low-frequency drive", "intermittent drive", or the like.

Here, issues regarding the pause drive will be described with reference to FIG. 12. In FIG. 12, rectangles with crossed lines in a column denoted by "DIN" represent periods during which image signals are input to the liquid crystal display device from the outside, rectangles with crossed lines in a column denoted by "Update" represent periods during which data voltages are written (updated) to liquid crystal capacitance based on image signals input from the outside, and rectangles with oblique lines in the column denoted by "Update" represent periods during which data voltages are written (updated) to the liquid crystal capacitance based on image signals stored in a frame memory or the like. A column denoted by "Polarity" indicates a polarity of the data voltage applied to the liquid crystal capacitance in a certain pixel forming section. Note that the same applies to FIGS. 4 to 8 and 13. In the example illustrated in FIG. 12, the polarity of the data voltage is inverted irregularly, and for the data voltage applied to the liquid crystal capacitance in the corresponding pixel forming section, a total length of negative polarity periods is longer than a total length of positive polarity periods. This results in poor display quality, such as flickering. Note that in the following description, "refresh" refers to updating a display image by writing a data voltage to liquid crystal capacitance of each pixel forming section in the display portion by selectively driving a plurality of gate bus lines in the display portion in sequence.

As a measure against deterioration of display quality caused by irregular polarity inversions of the data voltage, a drive method (hereinafter, referred to as "known method") has been proposed in which "a polarity bias value representing polarity bias of the data voltage is counted, and when the polarity bias value reaches a threshold value (an upper limit or a lower limit), the polarity of the data voltage is inverted, and the refresh is performed" (see for example, WO 2015/087587).

The known method described above will be described with reference to FIG. 13. In FIG. 13, a part denoted with a reference numeral 8 illustrates changes in polarity bias value. Pmax is an upper limit (a threshold value on a positive side) of the polarity bias value, and −Pmax is a lower limit (a threshold value on a negative side) of the polarity bias value. Note that the same applies to FIGS. 4, 6, and 8. As illustrated in FIG. 13, during a period in which the polarity of the data voltage applied to the liquid crystal capacitance in a certain pixel forming section is positive, the polarity bias value increases, and during a period in which the polarity of the data voltage applied to the liquid crystal capacitance in a certain pixel forming section is negative, the polarity bias value decreases. For example, during a period from time t91 to time t92, the polarity of the data voltage is negative, and the polarity bias value continuously decreases. Then, at time t92, the polarity bias value reaches the lower limit (−Pmax). Thus, at time t92, the refresh is performed with the polarity of the data voltage inverted. Thereafter, during a period from time t92 to time t93, the polarity of the data voltage is positive, and the polarity bias value continuously increases. Then, at time t93, the polarity bias value reaches the upper limit (Pmax). Thus, at time t93, the refresh is performed with the polarity of the data voltage inverted. In this manner, the polarity bias value changes within a range from the lower limit to the upper limit.

SUMMARY

According to the known method (see FIG. 13), the polarity of the data voltage applied to each liquid crystal capacitance is balanced, thereby suppressing deterioration of display quality caused by irregular polarity inversion of the data voltage. However, the known method can be adopted only in a liquid crystal display device that can refresh asynchronously with input of an image signal. That is, the known method cannot be adopted for a liquid crystal display device in which the refresh is performed in complete synchronization with input of an image signal. In other words, the known method cannot be adopted in a system in which input of an image signal from a host to a liquid crystal display device and drive of the liquid crystal display device are performed in complete synchronization.

A purpose of the following disclosure, therefore, is to suppress deterioration of display quality caused by polarity bias of a data voltage in a liquid crystal display device in which a refresh is performed in complete synchronization with an image signal input from the outside.

(1) A liquid crystal display device according to some embodiments of the disclosure includes a display portion including a plurality of image signal lines, a plurality of scanning signal lines intersecting the plurality of image signal lines, and a plurality of pixel forming sections corresponding to intersections of the plurality of image signal lines and the plurality of scanning signal lines, respectively, and is provided with a scan frame period during which the plurality of scanning signal lines are selectively driven in sequence synchronously with an image signal input from the outside and a pause frame period during which driving of the plurality of scanning signal lines is paused, the liquid crystal display device includes an image signal line drive circuit configured to apply a data voltage corresponding to the image signal to liquid crystal capacitance included in each of the plurality of pixel forming sections by driving each of the plurality of image signal lines, a scanning signal line drive circuit configured to selectively drive the plurality of scanning signal lines in sequence, and a drive control circuit including a counter configured to count a polarity bias value representing polarity bias of the data voltage applied to the liquid crystal capacitance and configured to control operations of the image signal line drive circuit and the scanning signal line drive circuit in accordance with the polarity bias value, in which during a scan frame period in which the polarity bias value is greater than a predetermined upper limit at a start of input of one frame of the image signal, the drive control circuit reduces the polarity bias value by controlling the operations of the image signal line drive circuit and the scanning signal line drive circuit, during a scan frame period in which the polarity bias value is smaller than a predetermined lower limit at the start of input of one frame of the image signal, the drive control circuit increases the polarity bias value by controlling the operations of the image signal line drive circuit and the scanning signal line drive circuit, and during a scan frame period in which the polarity bias value is equal to or greater than the lower limit and equal to or smaller than the upper limit at the start of input of one frame of the image signal, the drive control circuit applies a data voltage having a polarity opposite to a polarity of a data voltage applied to the liquid crystal capacitance during an immediately preceding scan frame period to the liquid crystal capacitance by controlling the operations of the image signal line drive circuit and the scanning signal line drive circuit.

(2) A liquid crystal display device according to some embodiments of the disclosure includes the configuration of (1), and the counter counts the polarity bias value throughout the scan frame period and the pause frame period.

(3) A liquid crystal display device according to some embodiments of the disclosure includes the configuration of (1), and the scan frame period includes a vertical blanking period, and the counter counts the polarity bias value throughout the vertical blanking period and the pause frame period.

(4) A liquid crystal display device according to some embodiments of the disclosure includes the configuration of (3), and the drive control circuit includes an average pixel value calculation circuit configured to calculate an average pixel value that is an average value of pixel values of the plurality of pixel forming sections based on one frame of the image signal, and the counter increases or decreases the polarity bias value by K×C per unit time according to the polarity of the data voltage applied to the liquid crystal capacitance, when K is a coefficient corresponding to the average pixel value and C is a predetermined constant.

(5) A liquid crystal display device according to some embodiments of the disclosure includes any one of the configurations (1) to (4), and the drive control circuit determines whether the polarity bias value is equal to or greater than the lower limit and equal to or smaller than the upper limit at the start of input of one frame of the image signal, based on flag data that is binary data.

(6) A liquid crystal display device according to some embodiments of the disclosure includes the configuration of (5), and the flag data is updated every time the polarity bias value changes, based on the polarity bias value changed.

(7) A liquid crystal display device according to some embodiments of the disclosure includes the configuration of (5), and the flag data is updated at the start of input of one frame of the image signal, based on the polarity bias value.

(8) A liquid crystal display device according to some embodiments of the disclosure includes a display portion including a plurality of image signal lines, a plurality of scanning signal lines intersecting the plurality of image signal lines, and a plurality of pixel forming sections corresponding to intersections of the plurality of image signal lines and the plurality of scanning signal lines, respectively, and is provided with a scan frame period during which the plurality of scanning signal lines are selectively driven in sequence and a pause frame period during which driving of the plurality of scanning signal lines is paused, the liquid crystal display device includes an image signal line drive circuit configured to apply a data voltage corresponding to an image signal input from the outside to liquid crystal capacitance included in each of the plurality of pixel forming sections by driving each of the plurality of image signal lines, a scanning signal line drive circuit configured to selectively drive the plurality of scanning signal lines in sequence, a drive control circuit including a counter configured to count a polarity bias value representing polarity bias of the data voltage applied to the liquid crystal capacitance and configured to control operations of the image signal line drive circuit and the scanning signal line drive circuit in accordance with the polarity bias value, and a frame memory configured to store one frame of the image signal, in which a drive system is dynamically switched between a first system in which the plurality of scanning signal lines are driven synchronously with the image signal and a second system in which the plurality of scanning signal lines are driven asynchronously with the image signal, in a case where the drive system is switched to the first system, during a scan frame period in which the polarity bias value is greater than a predetermined upper limit at a start of input of one frame of the image signal, the drive control circuit reduces the polarity bias value by controlling the operations of the image signal line drive circuit and the scanning signal line drive circuit, during a scan frame period in which the polarity bias value is smaller than a predetermined lower limit at the start of input of one frame of the image signal, the drive control circuit increases the polarity bias value by controlling the operations of the image signal line drive circuit and the scanning signal line drive circuit, and during a scan frame period in which the polarity bias value is equal to or greater than the lower limit and equal to or smaller than the upper limit at the start of input of one frame of the image signal, the drive control circuit applies a data voltage having a polarity opposite to a polarity of a data voltage applied to the liquid crystal capacitance during an immediately preceding scan frame period to the liquid crystal capacitance by controlling the operations of the image signal line drive circuit and the scanning signal line drive circuit, and in a case where the drive system is switched to the second system, after the polarity bias value reaches the upper limit, the drive control circuit reduces the polarity bias value by controlling the operations of the image signal line drive circuit and the scanning signal line drive circuit using the image signal stored in the frame memory, after the polarity bias value reaches the lower limit, the drive control circuit increases the polarity bias value by controlling the operations of the image signal line drive circuit and the scanning signal line drive circuit using the image signal stored in the frame memory, and during a scan frame period in which the polarity bias value does not reach either the upper limit or the lower limit, the drive control circuit applies a data voltage having a polarity opposite to a polarity of a data voltage applied to the liquid crystal capacitance during an immediately preceding scan frame period to the liquid crystal capacitance by controlling the operations of the image signal line drive circuit and the scanning signal line drive circuit.

(9) In a method of driving a liquid crystal display device according to some embodiments of the disclosure, the liquid crystal display device is provided with a scan frame period during which a plurality of scanning signal lines are selectively driven in sequence synchronously with an image signal input from the outside and a pause frame period during which driving of the plurality of scanning signal lines is paused, the liquid crystal display device includes a display portion including a plurality of image signal lines, the plurality of scanning signal lines intersecting the plurality of image signal lines, and a plurality of pixel forming sections corresponding to intersections of the plurality of image signal lines and the plurality of scanning signal lines, respectively, an image signal line drive circuit configured to apply a data voltage corresponding to the image signal to liquid crystal capacitance included in each of the plurality of pixel forming sections by driving each of the plurality of image signal lines, and a scanning signal line drive circuit configured to selectively drive the plurality of scanning signal lines in sequence, the method includes counting a polarity bias value representing polarity bias of the data voltage applied to the liquid crystal capacitance, and controlling operations of the image signal line drive circuit and the scanning signal line drive circuit in accordance with the polarity bias value during the scan frame period, in which in the controlling, during a scan frame period in which the polarity bias value is greater than a predetermined upper limit at a start of input of one frame of the image signal, the polarity bias value is reduced by controlling the operations of the image signal line drive circuit and the scanning signal line drive circuit, in the controlling, during a scan frame period in which the polarity bias value is smaller than a predetermined lower limit at the start of input of one frame of the image signal, the polarity bias value is increased by controlling the operations of the image signal line drive circuit and the scanning signal line drive circuit, and in the controlling, during a scan frame period in which the polarity bias value is equal to or greater than the lower limit and equal to or smaller than the upper limit at the start of input of one frame of the image signal, a data voltage having a polarity opposite to a polarity of a data voltage applied to the liquid crystal capacitance during an immediately preceding scan frame period is applied to the liquid crystal capacitance by controlling the operations of the image signal line drive circuit and the scanning signal line drive circuit.

(10) In a method of driving a liquid crystal display device according to some embodiments of the disclosure, the liquid crystal display device is provided with a scan frame period during which a plurality of scanning signal lines are selectively driven in sequence and a pause frame period in which driving of the plurality of scanning signal lines is paused, the liquid crystal display device includes a display portion including a plurality of image signal lines, the plurality of scanning signal lines intersecting the plurality of image signal lines, and a plurality of pixel forming sections corresponding to intersections of the plurality of image signal lines and the plurality of scanning signal lines, respectively, an image signal line drive circuit configured to apply a data voltage corresponding to an image signal input from the outside to liquid crystal capacitance included in each of the plurality of pixel forming sections by driving each of the plurality of image signal lines, a scanning signal line drive circuit configured to selectively drive the plurality of scanning signal lines in sequence, and a frame memory configured to store one frame of the image signal, and in the liquid crystal display device, a drive system is dynamically switched between a first system in which the plurality of scanning signal lines are driven synchronously with the image signal and a second system in which the plurality of scanning signal lines are driven asynchronously with the image signal, the method includes counting a polarity bias value representing polarity bias of the data voltage applied to the liquid crystal capacitance, and controlling operations of the image signal line drive circuit and the scanning signal line drive circuit in accordance with the polarity bias value during the scan frame period, in which in a case where the drive system is switched to the first system, in the controlling, during a scan frame period in which the polarity bias value is greater than a predetermined upper limit at a start of input of one frame of the image signal, the polarity bias value is reduced by controlling the operations of the image signal line drive circuit and the scanning signal line drive circuit, in the controlling, during a scan frame period in which the polarity bias value is smaller than a predetermined lower limit at the start of input of one frame of the image signal, the polarity bias value is increased by controlling the operations of the image signal line drive circuit and the scanning signal line drive circuit, and in the controlling, during a scan frame period in which the polarity bias value is equal to or greater than the lower limit and equal to or smaller than the upper limit at the start of input of one frame of the image signal, a data voltage having a polarity opposite to a polarity of a data voltage applied to the liquid crystal capacitance during an immediately preceding scan frame period is applied to the liquid crystal capacitance by controlling the operations of the image signal line drive circuit and the scanning signal line drive circuit, and in a case where the drive system is switched to the second system, after the polarity bias value reaches the upper limit, in the controlling, the polarity bias value is reduced by controlling the operations of the image signal line drive circuit and the scanning signal line drive circuit using the image signal stored in the frame memory, after the polarity bias value reaches the lower limit, in the controlling, the polarity bias value is increased by applying the data voltage to the liquid crystal capacitance by controlling the operations of the image signal line drive circuit and the scanning signal line drive circuit using the image signal stored in the frame memory, and in the controlling, during a scan frame period in which the polarity bias value does not reach either the upper limit or the lower limit, a data voltage having a polarity opposite to a polarity of a data voltage applied to the liquid crystal capacitance during an immediately preceding scan frame period is applied to the liquid crystal capacitance by controlling the operations of the image signal line drive circuit and the scanning signal line drive circuit.

In the liquid crystal display device according to some embodiments of the disclosure, a refresh (updating the display image by writing the data voltage to the liquid crystal capacitance in each pixel forming section in the display portion by selectively driving the plurality of scanning signal lines in the display portion in sequence) is performed synchronously with the image signal input from the outside. In such a liquid crystal display device, the drive control circuit that controls the operations of liquid crystal drive circuits (the scanning signal line drive circuit and the image signal line drive circuit) is provided with the counter that counts the polarity bias value that represents the polarity bias of the data voltage. When the image signal is input, the operations of the liquid crystal drive circuits are controlled as follows based on the polarity bias value. During the scan frame period in which the polarity bias value is greater than the upper limit at the start of input of one frame of the image signal, the operations of the liquid crystal drive circuits are controlled so that the polarity bias value becomes smaller, and during the scan frame period in which the polarity bias value is smaller than the lower limit at the start of input of one frame of the image signal, the operations of the liquid crystal drive circuits are controlled so that the polarity bias value becomes larger. Thus, by appropriately setting the upper limit and the lower limit, it is possible to prevent large polarity bias in the data voltage that affects display quality from occurring. As described above, in the liquid crystal display device in which the refresh is performed in complete synchronization with an image signal input from the outside, deterioration of display quality caused by the polarity bias of the data voltage is suppressed.

BRIEF DESCRIPTION OF DRAWINGS

The disclosure will be described with reference to the accompanying drawings, wherein like numbers reference like elements.

DESCRIPTION OF EMBODIMENTS

Embodiments will be described below with reference to the accompanying drawings. With respect to a second embodiment and a third embodiment, differences from a first embodiment will be mainly described. Note that "polarity bias of a data voltage applied to liquid crystal capacitance" may be simply referred to as "polarity bias".

1. First Embodiment

1.1 Overall Configuration and Operation Outline

Figure 2:
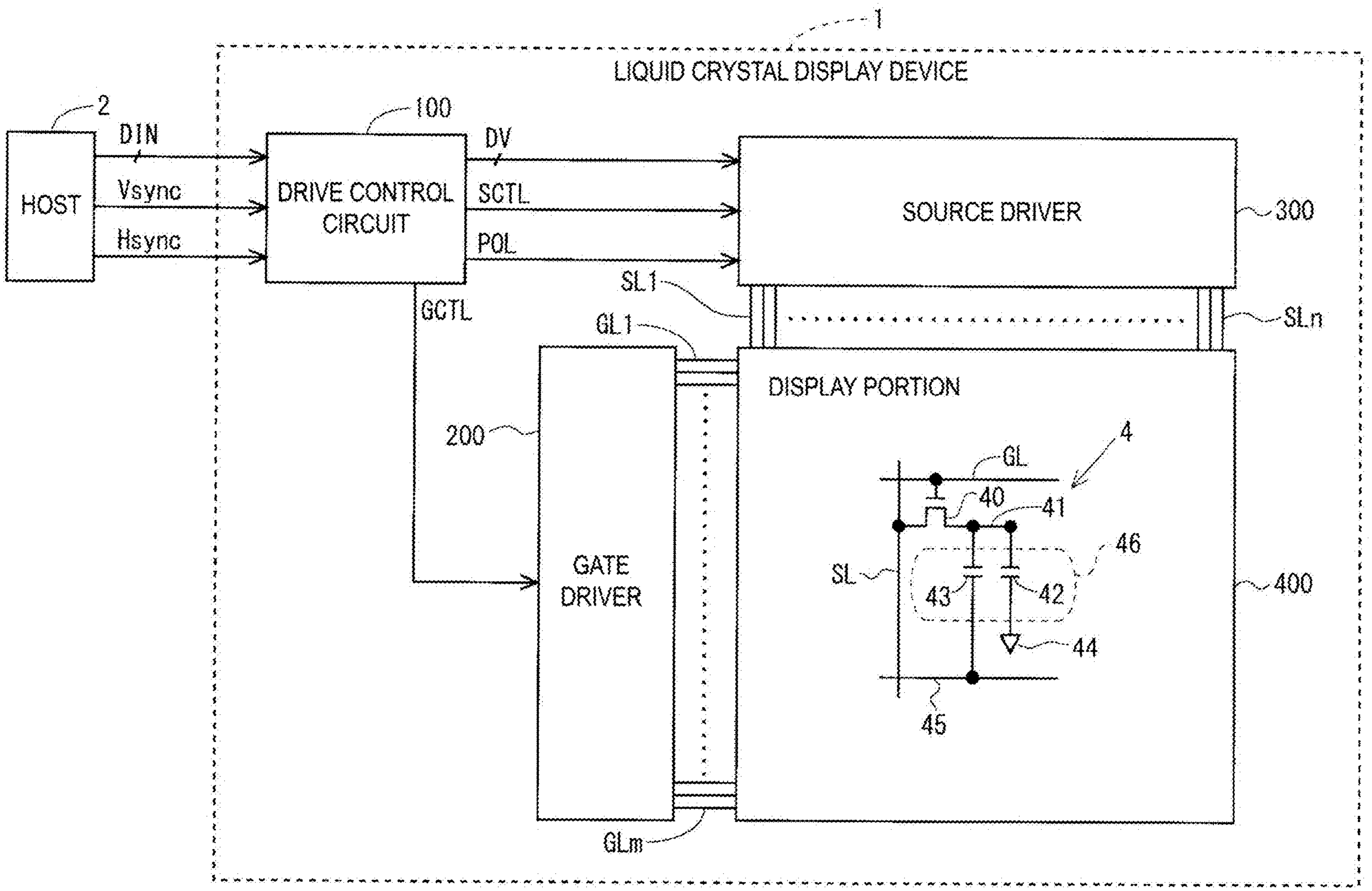
FIG. 2 is a block diagram illustrating an overall configuration of a liquid crystal display device according to the first embodiment.

FIG. 2 is a block diagram illustrating an overall configuration of an active matrix liquid crystal display device 1 according to the first embodiment. The liquid crystal display device 1 includes a drive control circuit 100, a gate driver (scanning signal line drive circuit) 200, a source driver (image signal line drive circuit) 300, and a display portion 400. As illustrated in FIG. 2, the liquid crystal display device 1 is connected to a host 2 and receives an image signal DIN representing an image to be displayed, a vertical synchronization signal Vsync, and a horizontal synchronization signal Hsync from the host 2.

In the display portion 400, a plurality (n) of source bus lines (image signal lines) SL1 to SLn and a plurality (m) of gate bus lines (scanning signal lines) GL1 to GLm are arranged. Pixel forming sections 4 that form pixels are provided at intersections of the n source bus lines SL1 to SLn and the m gate bus lines GL1 to GLm. That is, the display portion 400 includes a plurality (n×m) of pixel forming sections 4. Each of the pixel forming sections 4 includes: a thin film transistor (TFT) 40, which is a switching element having a gate terminal connected to a gate bus line GL passing through a corresponding intersection and a source terminal connected to a source bus line SL passing through this intersection; a pixel electrode 41 connected to a drain terminal of the thin film transistor 40; a common electrode 44 and an auxiliary capacitance electrode 45 provided in common to the plurality of pixel forming sections 4; liquid crystal capacitance 42 formed with the pixel electrode 41 and the common electrode 44; and auxiliary capacitance 43 formed with the pixel electrode 41 and the auxiliary capacitance electrode 45. A pixel capacitance 46 includes the liquid crystal capacitance 42 and the auxiliary capacitance 43. A configuration without the auxiliary capacitance 43 can also be adopted. Note that, in FIG. 2, only one pixel forming section 4 is illustrated.

The drive control circuit 100 receives an image signal DIN, a vertical synchronization signal Vsync, and a horizontal synchronization signal Hsync, and outputs a digital image signal DV, a gate control signal GCTL for controlling an operation of the gate driver 200, a source control signal SCTL for controlling an operation of the source driver 300, and a polarity control signal POL for controlling a polarity of a data voltage applied to each liquid crystal capacitance 42. Thus, the drive control circuit 100 controls the operations of the gate driver 200 and the source driver 300. The gate control signal GCTL includes, for example, a gate start pulse signal, a clear signal, and a gate clock signal. The source control signal SCTL includes, for example, a source start pulse signal, a source clock signal, and a latch strobe signal.

The gate driver 200 selectively drives the m gate bus lines GL1 to GLm in sequence based on the gate control signal GCTL transmitted from the drive control circuit 100.

The source driver 300 drives the n source bus lines SL1 to SLn based on the digital image signal DV, the source control signal SCTL, and the polarity control signal POL transmitted from the drive control circuit 100. At this time, the source driver 300 sequentially holds the digital image signals DV each indicating a voltage to be applied to a respective one of the source bus lines SL, at a timing when pulses of the source clock signal are generated. Then, at a timing when pulses of a latch strobe signal are generated, the held digital image signals DV are converted into data voltages, which are analog voltages in consideration of the polarity control signal POL. The data voltages are applied simultaneously to the n source bus lines SL1 to SLn as drive image signals.

In this manner, the data voltages applied to the n source bus lines SL1 to SLn, and the m gate bus lines GL1 to GLm are driven selectively in sequence, thereby displaying an image based on the image signal DIN on the display portion 400.

An operation period of the liquid crystal display device 1 according to this embodiment includes a scan frame period during which the m gate bus lines GL1 to GLm are selectively driven in sequence to write a data voltage to the liquid crystal capacitance 42 in each pixel forming section 4 in the display portion 400 (i.e., a scan frame period during which a refresh is performed) and a pause frame period during which drive of the m gate bus lines GL1 to GLm is paused. That is, the liquid crystal display device 1 according to this embodiment adopts pause drive. In the liquid crystal display device 1 according to this embodiment, the refresh is performed synchronously with the image signal DIN. In other words, the liquid crystal display device 1 according to this embodiment is driven in complete synchronization with the output of the signal (image signal DIN) from the host 2.

Figure 3:
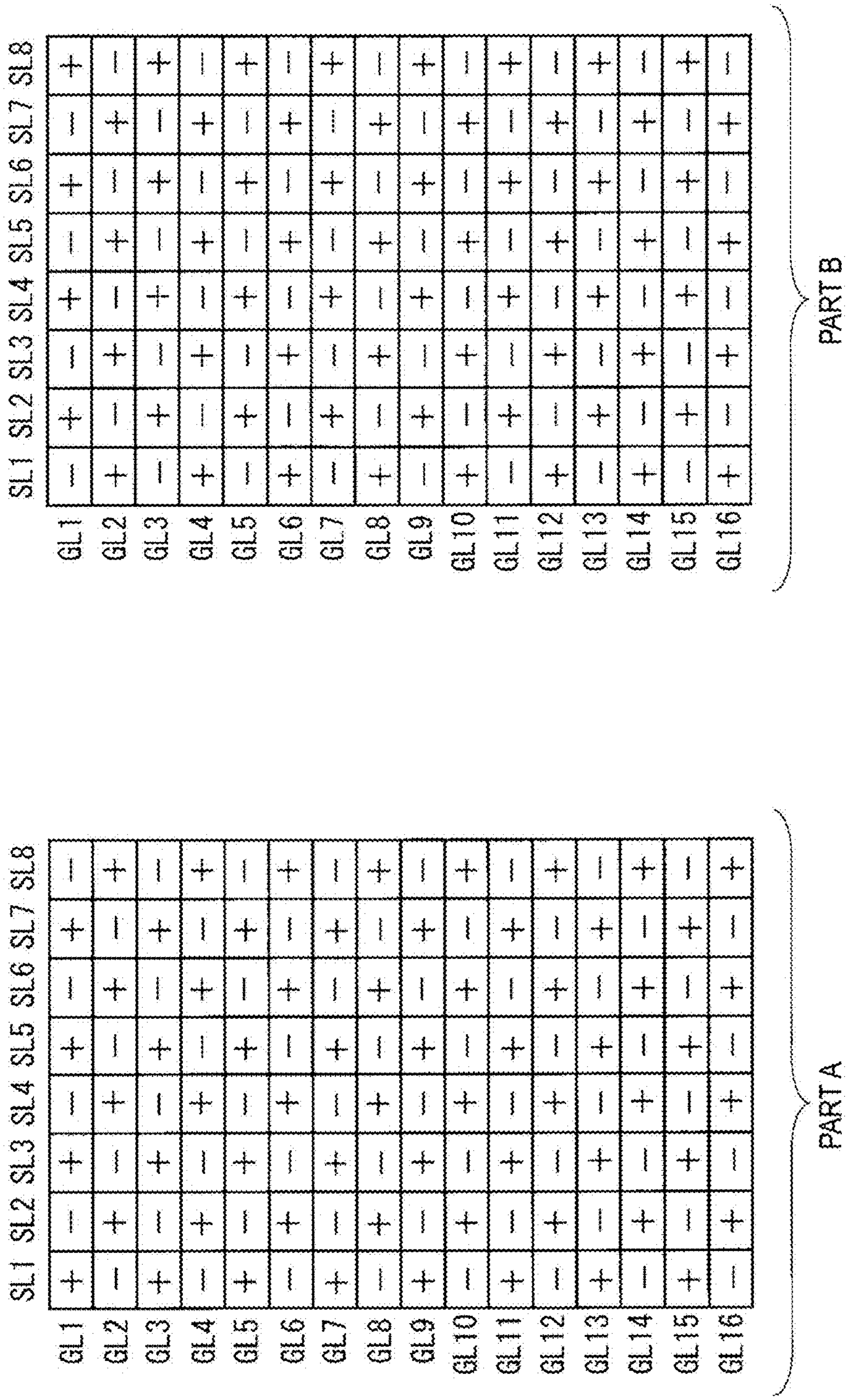
FIG. 3 is a diagram for describing dot inversion drive.

Although a method of inverting the polarity of the data voltage is not limited, it is assumed that dot inversion drive is adopted in this embodiment. The dot inversion drive is a driving method that inverts the polarity between the adjacent pixel forming sections in a direction in which the gate bus lines GL extend, and the polarity between the adjacent pixel forming sections in a direction in which the source bus lines SL extend. For example, the attention is paid to the polarity of the data voltages (liquid crystal application voltages) in the (16×8) pixel forming sections 4 provided corresponding to the intersections of the 16 gate bus lines GL1 to GL16 and the 8 source bus lines SL1 to SL8. When the state before polarity inversion is as illustrated in part A of FIG. 3, the state after polarity inversion is as illustrated in part B of FIG. 3.

1.2 Drive Control Circuit

Next, the drive control circuit 100 will be described.

1.2.1 Specific Data

First, specific data used in the drive control circuit 100 will be described. The liquid crystal display device 1 according to this embodiment adopts the pause drive in which polarity inversion is performed irregularly. Therefore, it is necessary to be able to grasp the polarities of the data voltages in the plurality of pixel forming sections 4 in the display portion 400 throughout the period during which the liquid crystal display device 1 is in operation. Thus, polarity information is used for indicating whether the polarity states of the data voltages are as illustrated in part A of FIG. 3 or as illustrated in part B of FIG. 3. For the sake of simplicity, attention will be paid to the polarity of the data voltage in the pixel forming section 4 provided corresponding to the intersection of the gate bus line GL1 in the first row and the source bus line SL1 in the first column. Accordingly, a description that "the polarity of the data voltage is positive" means that the polarities of the data voltages are as illustrated in part A of FIG. 3, and a description that "the polarity of the data voltage is negative" means that the polarities of the data voltages are as illustrated in part B of FIG. 3.

In order to suppress deterioration of display quality caused by polarity bias of the data voltage, it is necessary to be able to grasp the degree of polarity bias throughout the period of the liquid crystal display device 1 being in operation. Thus, a polarity bias value is used for representing the polarity bias of the data voltage applied to the liquid crystal capacitance 42. Note that the polarity bias is a difference between a total time during which a positive polarity data voltage is applied to a certain pixel forming section 4 and a total time during which a negative polarity data voltage is applied to this certain pixel forming section 4. In order to prevent the polarity bias from becoming too large, an upper limit and a lower limit are set as threshold values to be compared with the polarity bias value. A flag (flag data) is used for indicating whether the polarity bias value is within a range from the lower limit to the upper limit. As will be described in detail later, when the polarity bias value becomes smaller than the lower limit, the polarity of the data voltage is fixed at positive polarity, and when the polarity bias value becomes greater than the upper limit, the polarity of the data voltage is fixed at negative polarity. Such an operation mode in which the polarity of the data voltage is fixed is referred to as "fixed mode". Thus, a flag indicating whether the polarity bias value is within the range from the lower limit to the upper limit is referred to as "fixed mode flag". Note that during a period in which the polarity bias value is maintained within the range from the lower limit to the upper limit, the polarity is inverted every time one frame of the image signal DIN is input. Thus, an operation mode during a period in which the polarity bias value is maintained within the range from the lower limit to the upper limit is referred to as "inversion mode". In the following, it is assumed that when the fixed mode flag is ON, the operation mode is the fixed mode, and when the fixed mode flag is OFF, the operation mode is the inversion mode.

1.2.2 Configuration

Figure 1:
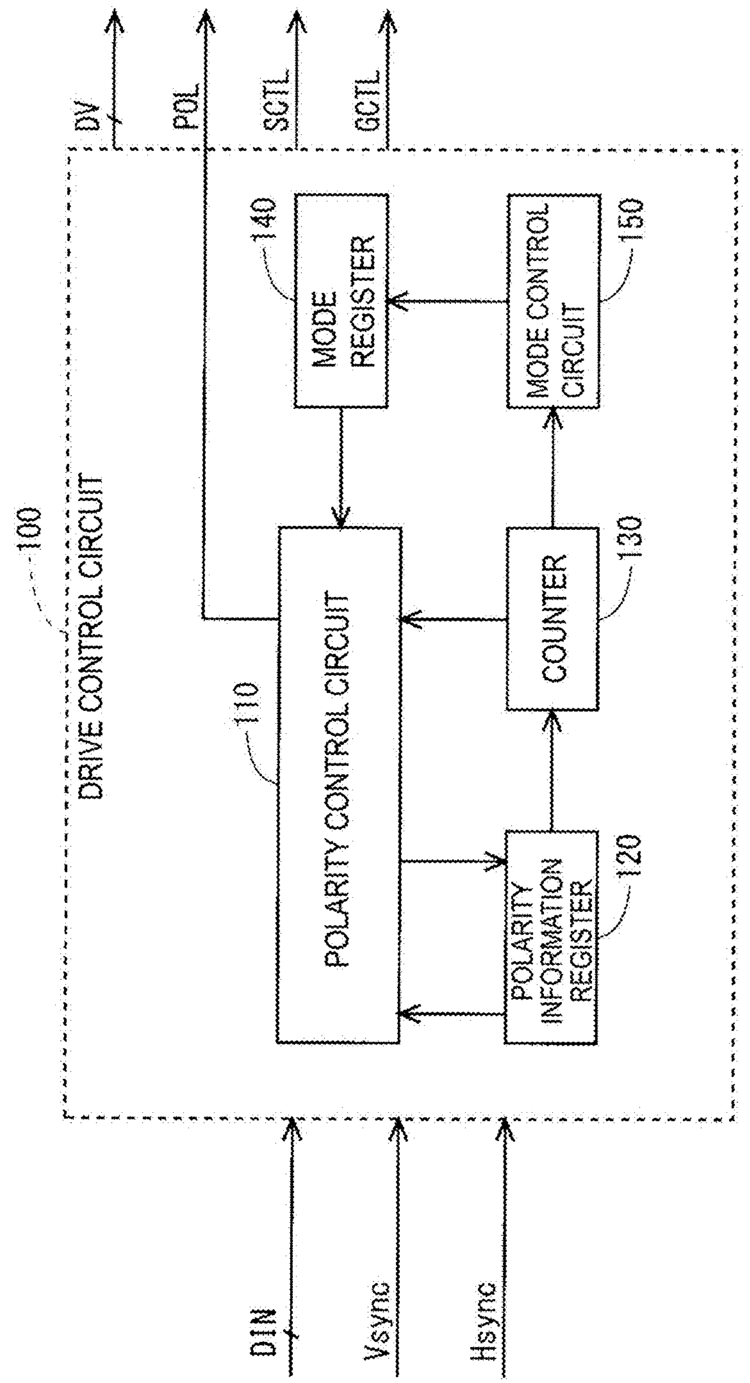
FIG. 1 is a block diagram illustrating a configuration of a drive control circuit according to a first embodiment.

Based on the above, a configuration of the drive control circuit in this embodiment will be described with reference to a block diagram illustrated in FIG. 1. As illustrated in FIG. 1, the drive control circuit 100 includes a polarity control circuit 110, a polarity information register 120, a counter 130, a mode register 140, and a mode control circuit 150.

The polarity information register 120 stores the polarity information described above. Note that the polarity information is binary data. The counter 130 counts the polarity bias value described above based on the polarity information stored in the polarity information register 120. The counter 130 counts the polarity bias value throughout the scan frame period and the pause frame period. In this regard, the polarity bias value increases during a period when the polarity of the data voltage is positive, and the polarity bias value decreases during a period when the polarity of the data voltage is negative.

The mode register 140 stores the fixed mode flag described above. Note that the fixed mode flag is binary data. Every time there is a change in the polarity bias value counted by the counter 130, the mode control circuit 150 compares the changed polarity bias value with the lower limit and the upper limit, and updates the fixed mode flag stored in the mode register 140 based on a result of the comparison. In this regard, when the polarity bias value changes from the value equal to or greater than the lower limit to the value smaller than the lower limit, the mode control circuit 150 updates the fixed mode flag from OFF to ON, when the polarity bias value changes from the value smaller than the lower limit to the value equal to or greater than the lower limit, the mode control circuit 150 updates the fixed mode flag from ON to OFF, when the polarity bias value changes from the value equal to or smaller than the upper limit to the value greater than the upper limit, the mode control circuit 150 updates the fixed mode flag from OFF to ON, and when the polarity bias value changes from the value greater than the upper limit to the value equal to or smaller than the upper limit, the mode control circuit 150 updates the fixed mode flag from ON to OFF.

The polarity control circuit 110 determines, at a start of input of one frame of the image signal DIN to the drive control circuit 100, the polarity of the data voltage to be applied to the liquid crystal capacitance 42 during the scan frame period corresponding to this one frame of the image signal DIN, based on the polarity information stored in the polarity information register 120, the polarity bias value output from the counter 130, and the fixed mode flag stored in the mode register 140. Then, the polarity control circuit 110 outputs a polarity control signal POL representing the determined polarity. In this regard, specifically, the polarity control circuit 110 determines the polarity of the data voltage as follows.

When the fixed mode flag is ON and the polarity bias value is greater than the upper limit, the polarity control circuit 110 determines the polarity of the data voltage to be negative. When the fixed mode flag is ON and the polarity bias value is smaller than the lower limit, the polarity control circuit 110 determines the polarity of the data voltage to be positive. When the fixed mode flag is OFF, the polarity control circuit 110 determines the polarity of the data voltage to be opposite to the polarity indicated by the polarity information stored in the polarity information register 120. Note that after determining the polarity of the data voltage in each scan frame period, the polarity control circuit 110 updates the polarity information stored in the polarity information register 120.

As described above, during a scan frame period in which the polarity bias value is greater than the predetermined upper limit at a start of input of one frame of the image signal DIN, the drive control circuit 100 controls the operations of the source driver 300 and the gate driver 200 so that the polarity bias value becomes smaller. During a scan frame period in which the polarity bias value is smaller than the predetermined lower limit at a start of input of one frame of the image signal DIN, the drive control circuit 100 controls the operations of the source driver 300 and the gate driver 200 so that the polarity bias value becomes larger (so that an absolute value of the polarity bias value becomes smaller). During a scan frame period in which the polarity bias value is equal to or greater than the lower limit and equal to or smaller than the upper limit at a start of input of one frame of the image signal DIN, the drive control circuit 100 controls the operations of the source driver 300 and the gate driver 200 so that a data voltage with a polarity opposite to the polarity of the data voltage applied to the liquid crystal capacitance 42 during the immediately preceding scan frame period is applied to the liquid crystal capacitance 42.

Note that a polarity bias value counting step is achieved by an operation in which the counter 130 counts the polarity bias value, and a drive control step is achieved by an operation in which the drive control circuit 100 controls the operations of the source driver 300 and the gate driver 200 based on the polarity bias value.

1.2.3 Example of Operation

Figure 4:
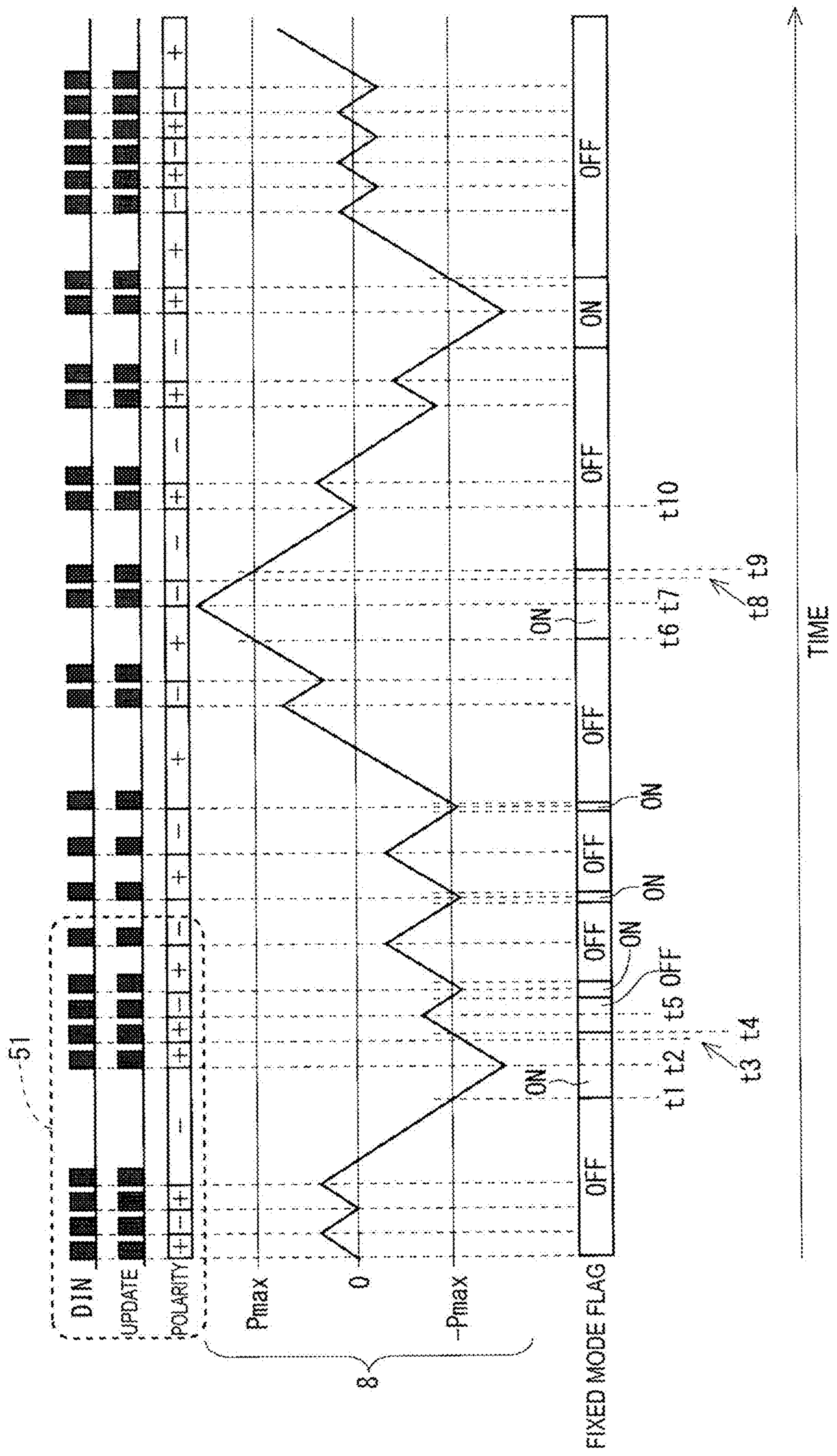
FIG. 4 is a diagram for describing an example of operation according to the first embodiment.
Figure 5:
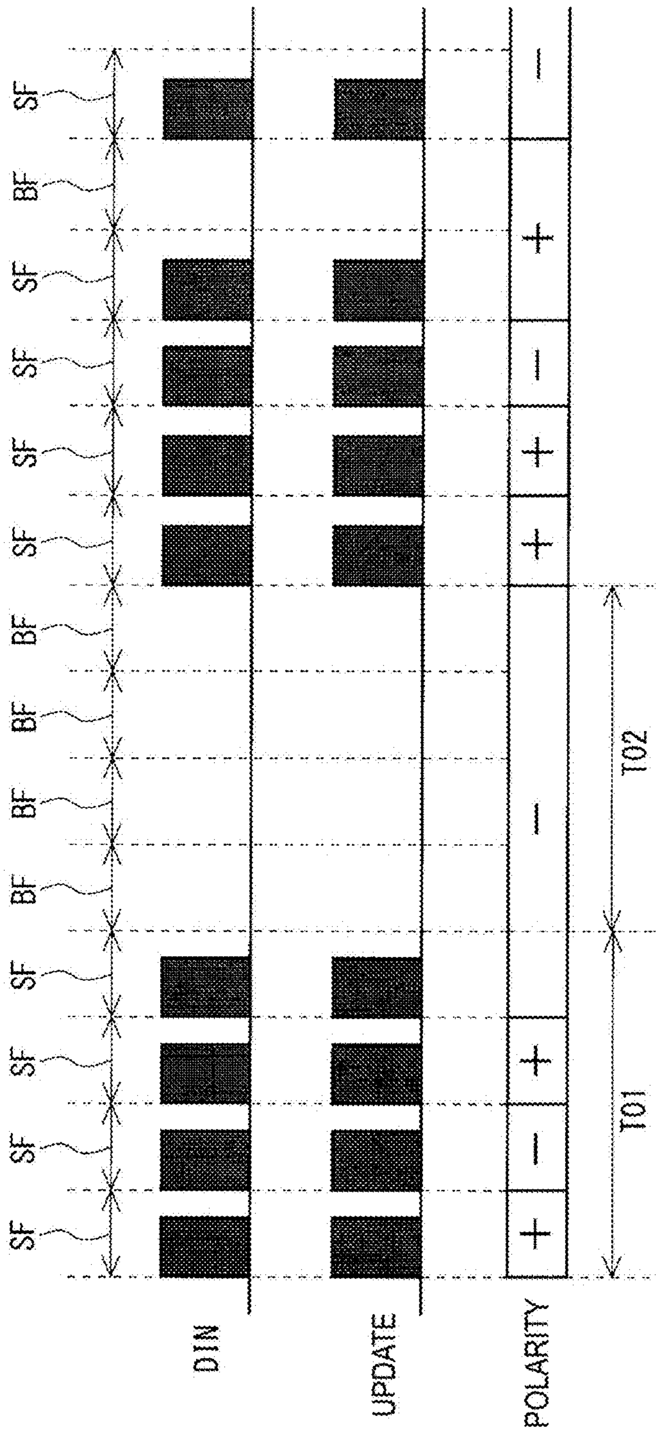
FIG. 5 is an enlarged view of a part indicated by a reference numeral 51 in FIG. 4.

An example of operation according to this embodiment will be described with reference to FIGS. 4 and 5. FIG. 5 is an enlarged view of a part indicated by a reference numeral 51 in FIG. 4. In FIG. 5, an arrow with a symbol SF indicates a scan frame period, and an arrow with a symbol BF indicates a pause frame period. For convenience of description, it is assumed here that a length of one scan frame period and a length of one pause frame period are equal to a length of one frame period when normal drive is performed with a drive frequency of 60 Hz. For example, during a period indicated by an arrow with a reference sign T01 in FIG. 5, one frame of the image signal DIN is input for every frame period when normal drive is performed, and during a period indicated by an arrow with a reference sign T02 in FIG. 5, the image signal DIN is not input for a period corresponding to a length of four frame periods when normal drive is performed. Thus, in this embodiment, one frame of the image signal DIN may be input every one frame period when normal drive is performed, or a state in which no image signal DIN is input from the outside may continue for some period of time.

Description will be given with reference to FIG. 4. During a period in which the polarity bias value remains within a range from the upper limit to the lower limit, the fixed mode flag is maintained at OFF. During this period, the operation mode is the inversion mode, and the polarity is inverted every time one frame of the image signal DIN is input. In the following, attention will be paid to some periods in FIG. 4.

At time t1, the polarity bias value changes from the value equal to or larger than the lower limit to the value smaller than the lower limit. This changes the fixed mode flag from OFF to ON. At time t2, input of one frame of the image signal DIN starts. At time t2, the fixed mode flag is ON and the polarity bias value is smaller than the lower limit. Therefore, the polarity of the data voltage in the scan frame period starting from time t2 is positive. Note that as described above, the polarity here is the polarity of the data voltage in the pixel forming section 4 provided corresponding to the intersection of the gate bus line GL1 and the source bus line SL1. Accordingly, for example, in the pixel forming section 4 provided corresponding to the intersection of the gate bus line GL2 and the source bus line SL1, the polarity of the data voltage in the scan frame period starting from time t2 is negative.

At time t3, input of one frame of the image signal DIN starts. At time t3, the fixed mode flag is still ON (i.e., the operation mode is the fixed mode), and the polarity bias value is smaller than the lower limit. Therefore, the polarity of the data voltage during the scan frame period starting from time t3 is maintained at positive polarity. At time t4, the polarity bias value changes from the value smaller than the lower limit to the value equal to or greater than the lower limit. This changes the fixed mode flag from ON to OFF.

At time t5, input of one frame of the image signal DIN starts. At time t5, the fixed mode flag is OFF. At this time, the polarity of the data voltage during the scan frame period that started from time t3 is positive, so the polarity indicated by the polarity information stored in the polarity information register 120 is positive. Accordingly, the polarity of the data voltage in the scan frame period starting from time t5 becomes negative.

At time t6, the polarity bias value changes from the value equal to or smaller than the upper limit to the value greater than the upper limit. This changes the fixed mode flag from OFF to ON. At time t7, input of one frame of the image signal DIN starts. At time t7, the fixed mode flag is ON, and the polarity bias value is greater than the upper limit. Therefore, the polarity of the data voltage in the scan frame period starting from time t7 is negative.

At time t8, input of one frame of the image signal DIN starts. At time t8, the fixed mode flag is still ON (i.e., the operation mode is the fixed mode), and the polarity bias value is greater than the upper limit. Therefore, the polarity of the data voltage during the scan frame period starting from time t8 is maintained at negative polarity. At time t9, the polarity bias value changes from the value greater than the upper limit to the value equal to or smaller than the upper limit. This changes the fixed mode flag from ON to OFF.

At time t10, input of one frame of the image signal DIN starts. At time t10, the fixed mode flag is OFF. At this time, the polarity of the data voltage during the scan frame period that started from time t8 is negative, so that the polarity indicated by the polarity information stored in the polarity information register 120 is negative. Accordingly, the polarity of the data voltage in the scan frame period starting from time t10 becomes positive.

As described above, when the polarity bias value becomes smaller than the lower limit, the polarity of the data voltage when a refresh is performed is fixed to the positive polarity until the polarity bias value becomes equal to or greater than the lower limit, and when the polarity bias value becomes greater than the upper limit, the polarity of the data voltage when a refresh is performed is fixed to the negative polarity until the polarity bias value becomes equal to or smaller than the upper limit. During a period in which the polarity bias value is maintained within the range from the lower limit to the upper limit, a refresh is performed with the polarity of the data voltage inverted in response to the input of one frame of the image signal DIN.

1.3 Effects

In the liquid crystal display device 1 according to this embodiment, a refresh (updating a display image by writing a data voltage into the liquid crystal capacitance 42 in each pixel forming section 4 in the display portion 400 by selectively driving the plurality of gate bus lines GL in the display portion 400 in sequence) is performed synchronously with the image signal DIN transmitted from the host 2. In such a liquid crystal display device 1, the drive control circuit 100 that controls the operations of the gate driver 200 and the source driver 300 is provided with the counter 130 that counts the polarity bias value that represents the polarity bias of the data voltage. When the image signal DIN is input, the polarity of the data voltage is determined based on the polarity bias value as follows, and a refresh is performed. During the scan frame period in which the polarity bias value is greater than the upper limit at the start of input of one frame of the image signal DIN, the polarity of the data voltage is determined so that the polarity bias value becomes smaller, and during the scan frame period in which the polarity bias value is smaller than the lower limit at the start of input of one frame of the image signal DIN, the polarity of the data voltage is determined so that the polarity bias value becomes larger. Thus, by appropriately setting the upper limit and the lower limit, it is possible to prevent large polarity bias in the data voltage that affects display quality from occurring. As described above, according to this embodiment, in the liquid crystal display device 1 in which the refresh is performed in complete synchronization with the image signal DIN input from the outside, deterioration of display quality caused by the polarity bias of the data voltage is suppressed.

1.4 Modified Example

Figure 6:
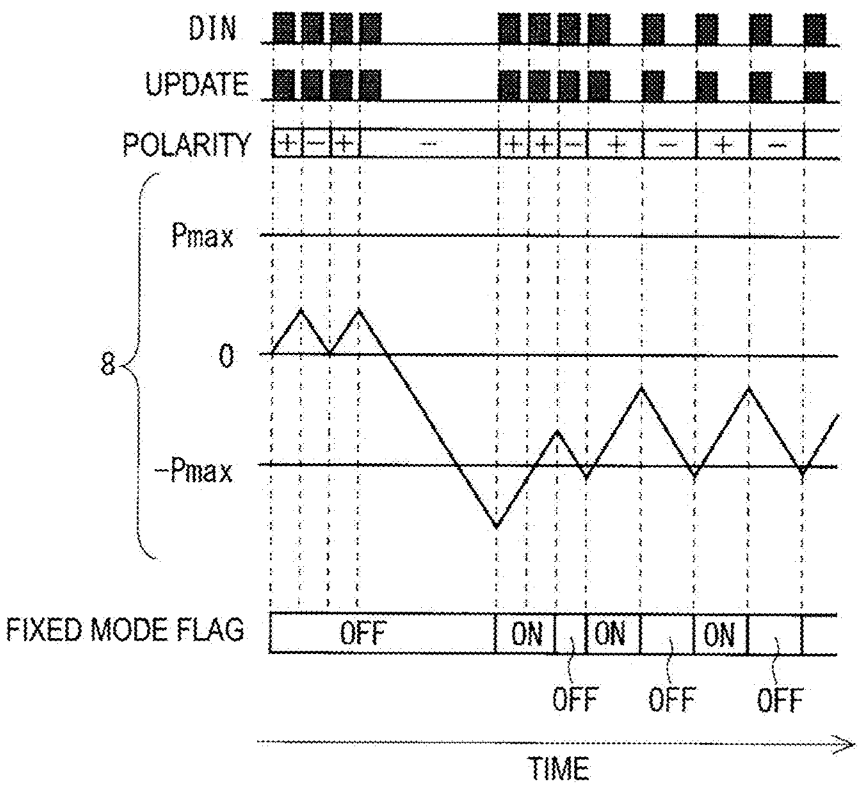
FIG. 6 is a diagram for describing timings at which a fixed mode flag changes in a modified example of the first embodiment.

In the first embodiment, the fixed mode flag changes when the polarity bias value changes across the threshold (the upper limit or the lower limit). For example, the fixed mode flag changes from OFF to ON when the polarity bias value changes from the value equal to or greater than the lower limit to the value smaller than the lower limit. However, the disclosure is not limited thereto. As illustrated in FIG. 6, the fixed mode flag may change at a start of input of a first one frame of the image signal DIN after the polarity bias value changes across the threshold (the upper limit or the lower limit). Thus, in this modified example, the fixed mode flag is updated at the start of input of one frame of the image signal DIN, based on the polarity bias value.

2. Second Embodiment 2.1 Overview

Figure 7:
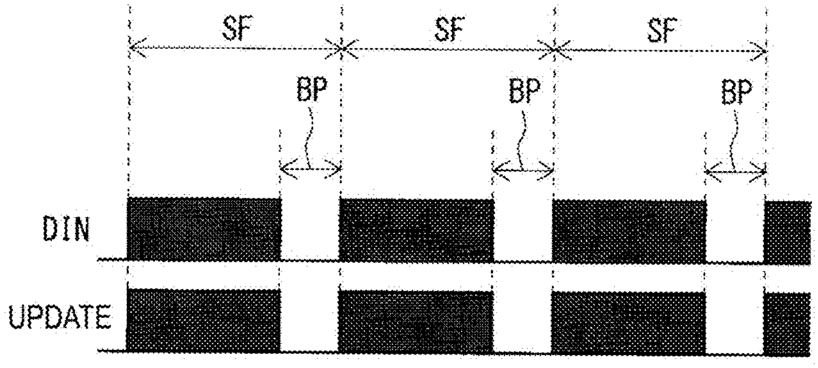
FIG. 7 is a diagram for describing a vertical blanking period in a second embodiment.

In general, as illustrated in FIG. 7, a scan frame period SF includes a vertical blanking period BP during which no vertical scanning is performed. This embodiment differs from the first embodiment in that a counter 130 counts a polarity bias value throughout a vertical blanking period and a pause frame period. In other respects, this embodiment is similar to the first embodiment.

2.2 Example of Operation

Figure 8:
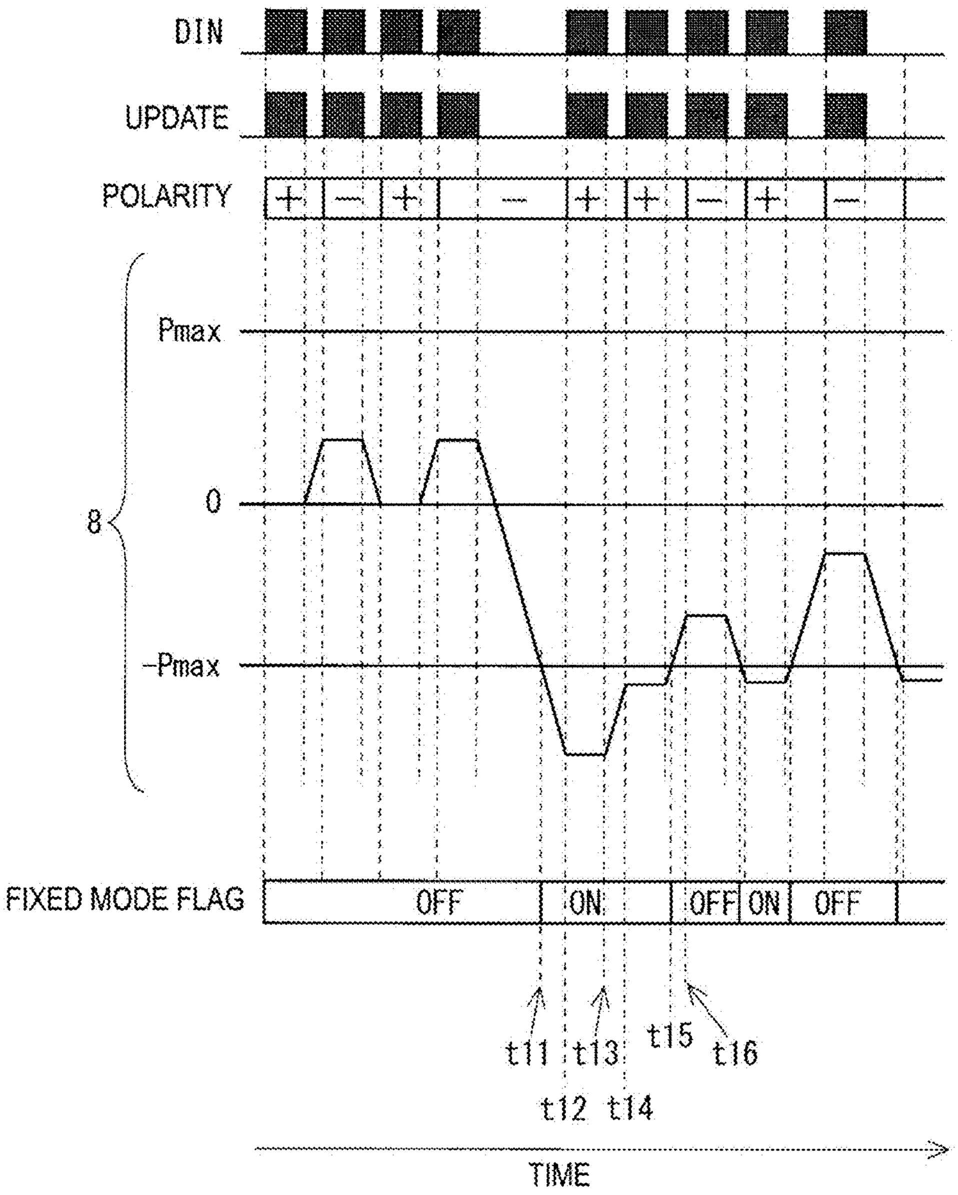
FIG. 8 is a diagram for describing changes in polarity bias value in the second embodiment.

An example of operation according to this embodiment will be described with reference to FIG. 8. As described above, the counter 130 counts the polarity bias value throughout the vertical blanking period and the pause frame period. In other words, during a period in which a plurality of gate bus lines GL are actually selectively driven in sequence, the counter 130 does not count the polarity bias value. Accordingly, as illustrated in FIG. 8, the polarity bias value does not change during the period in which the plurality of gate bus lines GL are actually selectively driven in sequence.

In the following, attention will be paid to some periods in FIG. 8. At time t11, the polarity bias value changes from the value equal to or greater than the lower limit to the value smaller than the lower limit. This changes the fixed mode flag from OFF to ON. At time t12, input of one frame of the image signal DIN starts. At time t12, the fixed mode flag is ON and the polarity bias value is smaller than the lower limit. Therefore, the polarity of the data voltage during the scan frame period starting from time t12 is positive. The polarity bias value does not change during a period from time t12 to time t13, and the polarity bias value starts to increase at time t13, which is a start time of the vertical blanking period.

At time t14, input of one frame of the image signal DIN starts. At time t14, the fixed mode flag is still ON (i.e., the operation mode is the fixed mode), and the polarity bias value is smaller than the lower limit. Therefore, the polarity of the data voltage during the scan frame period starting from time t14 is maintained at positive polarity. At time t15, the polarity bias value changes from the value smaller than the lower limit to the value equal to or greater than the lower limit. This changes the fixed mode flag from ON to OFF.

At time t16, input of one frame of the image signal DIN starts. At time t16, the fixed mode flag is OFF. At this time, the polarity of the data voltage during the scan frame period that started from time t14 is positive, so that the polarity indicated by the polarity information stored in a polarity information register 120 is positive. Accordingly, the polarity of the data voltage in the scan frame period starting from time t16 becomes negative.

2.3 Effects

According to this embodiment, similar to the first embodiment, in a liquid crystal display device 1 in which the refresh is performed in complete synchronization with the image signal DIN input from the outside, deterioration of display quality caused by the polarity bias of the data voltage is suppressed.

2.4 Modified Example

Degree of charge bias due to the polarity bias of the data voltage depends on a display gray scale (liquid crystal application voltage). Thus, in this modified example, a configuration is adopted in which the polarity bias value increases or decreases in accordance with an average pixel value by counting with the counter 130.

Figure 9:
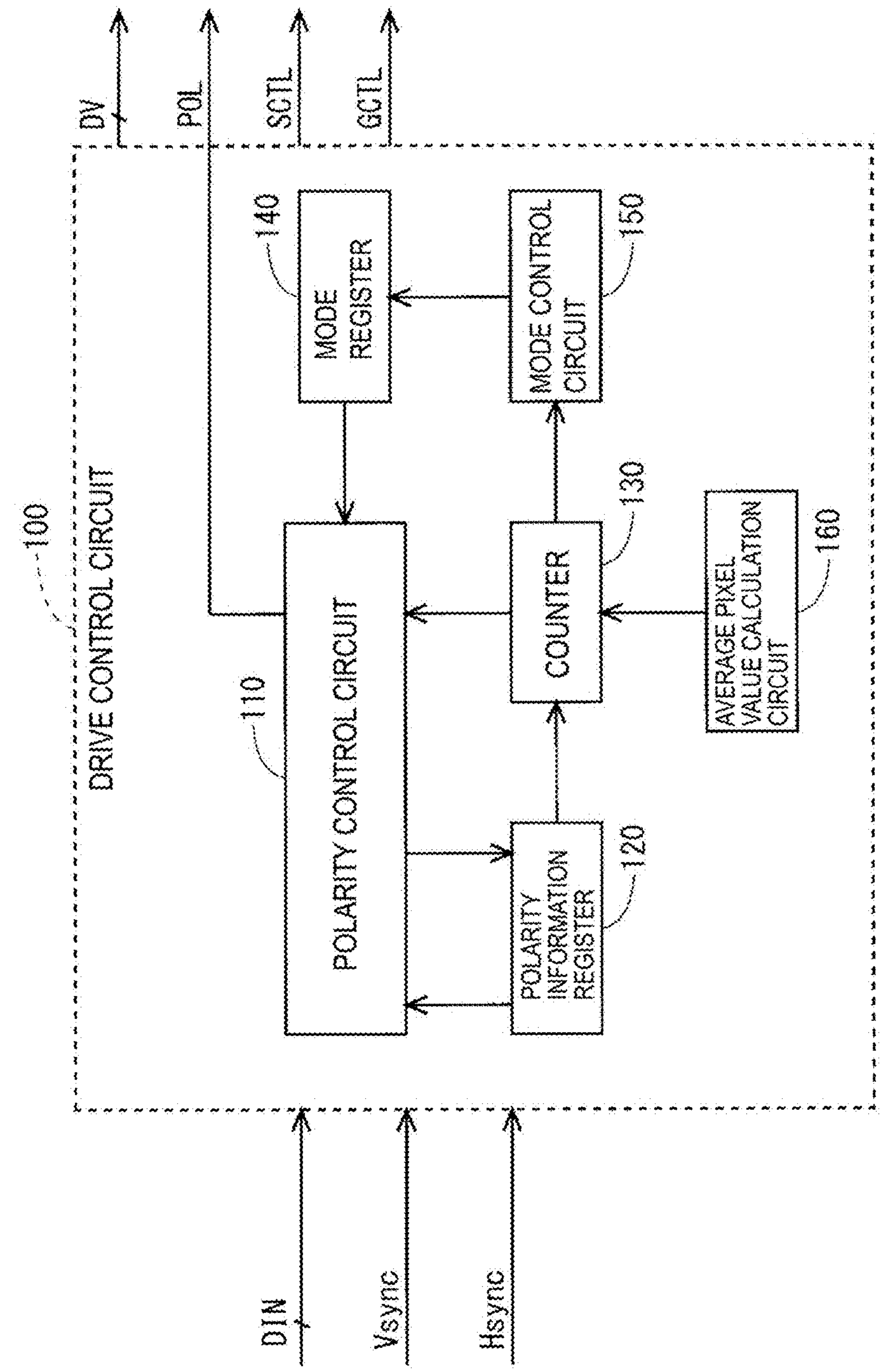
FIG. 9 is a block diagram illustrating a configuration of a drive control circuit according to a modified example of the second embodiment.

FIG. 9 is a block diagram illustrating a configuration of a drive control circuit 100 according to this modified example. The drive control circuit 100 includes an average pixel value calculation circuit 160 in addition to the constituent elements in the first embodiment (see FIG. 1). When attention is paid to each scan frame period, the counter 130 counts the polarity bias value during the vertical blanking period. Thus, at a start of the vertical blanking period of each scan frame period, the average pixel value calculation circuit 160 calculates an average pixel value for each scan frame period (an average value of the pixel values of all pixel forming sections 4 in the display portion 400) based on one frame of the image signal DIN.

In this modified example, the counter 130 changes the polarity bias value by K×C per unit time, when K is a coefficient corresponding to the average pixel value calculated by the average pixel value calculation circuit 160, and C is a predetermined constant. In this regard, the polarity bias value increases during a period in which the polarity of the data voltage applied to liquid crystal capacitance 42 is positive, and the polarity bias value decreases during a period in which the polarity of the data voltage applied to the liquid crystal capacitance 42 is negative. As described above, in this modified example, the counter 130 increases or decreases the polarity bias value by K×C per unit time in accordance with the polarity of the data voltage applied to the liquid crystal capacitance 42. Note that the constant C is determined in consideration of the characteristics of a panel of the liquid crystal display device 1. Z may be stored in a form of a table, or Z may be stored as a function that uses pixel values as input values, when Z is K×C.

With the configuration described above, it is possible to change the polarity bias value significantly as average pixel values become higher, or to change the polarity bias value significantly as average pixel values become lower. Thus, according to this modified example, the larger the liquid crystal application voltage is, the more the polarity bias value can be changed. This effectively reduces the degree of charge bias in the liquid crystal capacitance 42. As a result, deterioration of display quality is more effectively suppressed.

3. Third Embodiment 3.1 Overview

Systems that use liquid crystal display devices include a system that dynamically switches between a system in which a liquid crystal display device is driven synchronously with an input signal and a system in which the liquid crystal display device is driven asynchronously with the input signal. For example, there is a system in which panel self refresh (PSR) drive (a driving method of displaying images using data stored in a frame memory to reduce power consumption) is enabled when displaying still images, and the PSR drive is disabled when displaying moving pictures. Thus, an aspect in which the disclosure is applied to such a system will be described below as a third embodiment. Note that an overall configuration is similar to that of the first embodiment (see FIG. 2).

3.2 Drive System

In this embodiment, the drive system is dynamically switched between a first system in which a liquid crystal display device 1 is driven (a plurality of gate bus lines GL are driven) synchronously with an image signal DIN transmitted from a host 2, and a second system in which the liquid crystal display device 1 is driven (the plurality of gate bus lines GL are driven) asynchronously with the image signal DIN. When the drive system is switched to the first system, the PSR drive is disabled, and when the drive system is switched to the second system, PSR drive is enabled. When the display is switched from still image display to moving picture display, the drive system is switched from the second system to the first system, and when the display is switched from moving picture display to still image display, the drive system is switched from the first system to the second system.

3.3 Drive Control Circuit

Figure 10:
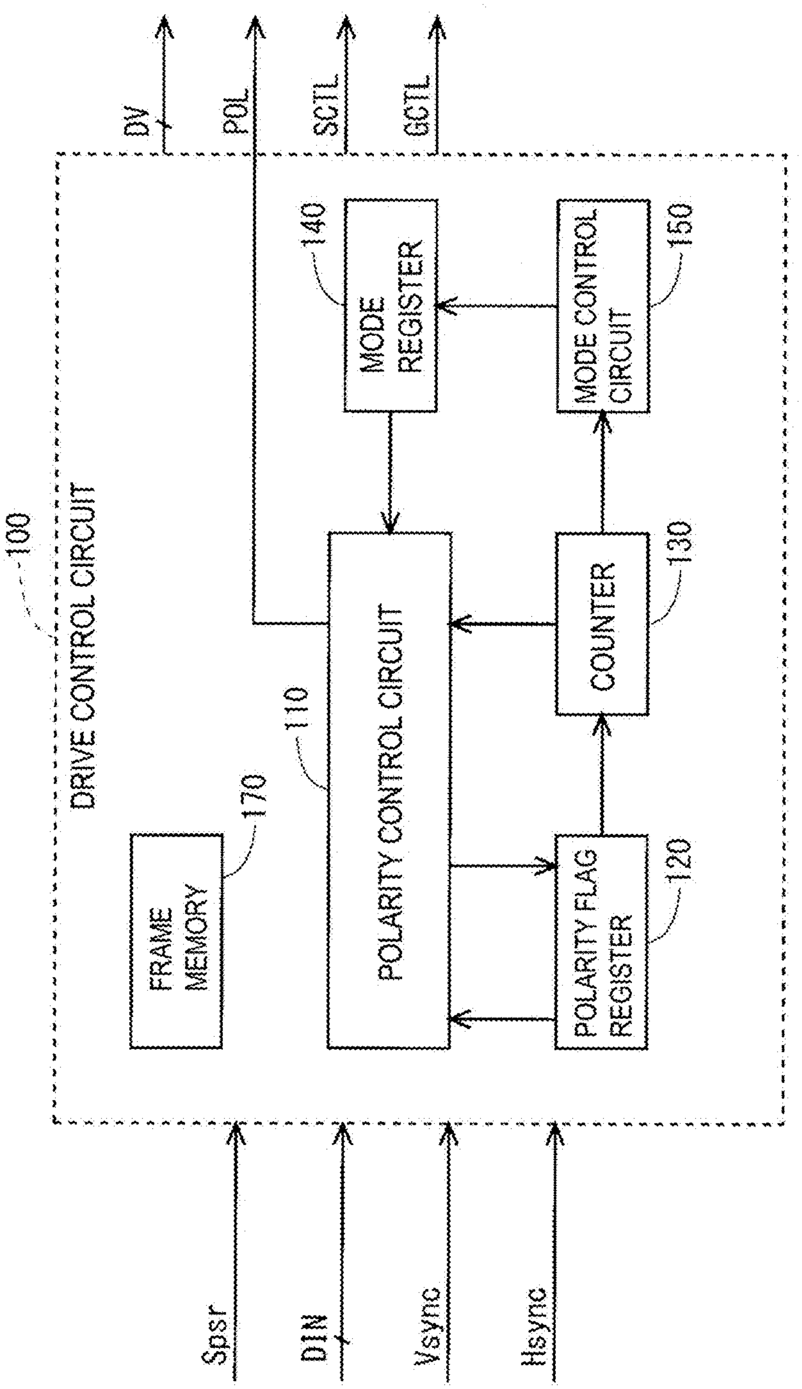
FIG. 10 is a block diagram illustrating a configuration of a drive control circuit according to a third embodiment.

FIG. 10 is a block diagram illustrating a configuration of a drive control circuit 100 according to this embodiment. The drive control circuit 100 includes a frame memory 170 in addition to the constituent elements in the first embodiment (see FIG. 1). The frame memory 170 stores the most recent one frame of an image signal DIN transmitted from the host 2.

When the drive system is switched to the first system, the drive control circuit 100 operates in a manner similar to the first embodiment. At this time, the frame memory 170 is not used because the PSR drive is disabled. That is, in the drive control circuit 100, a digital image signal DV is generated directly using the image signal DIN transmitted from the host 2.

Figure 13:
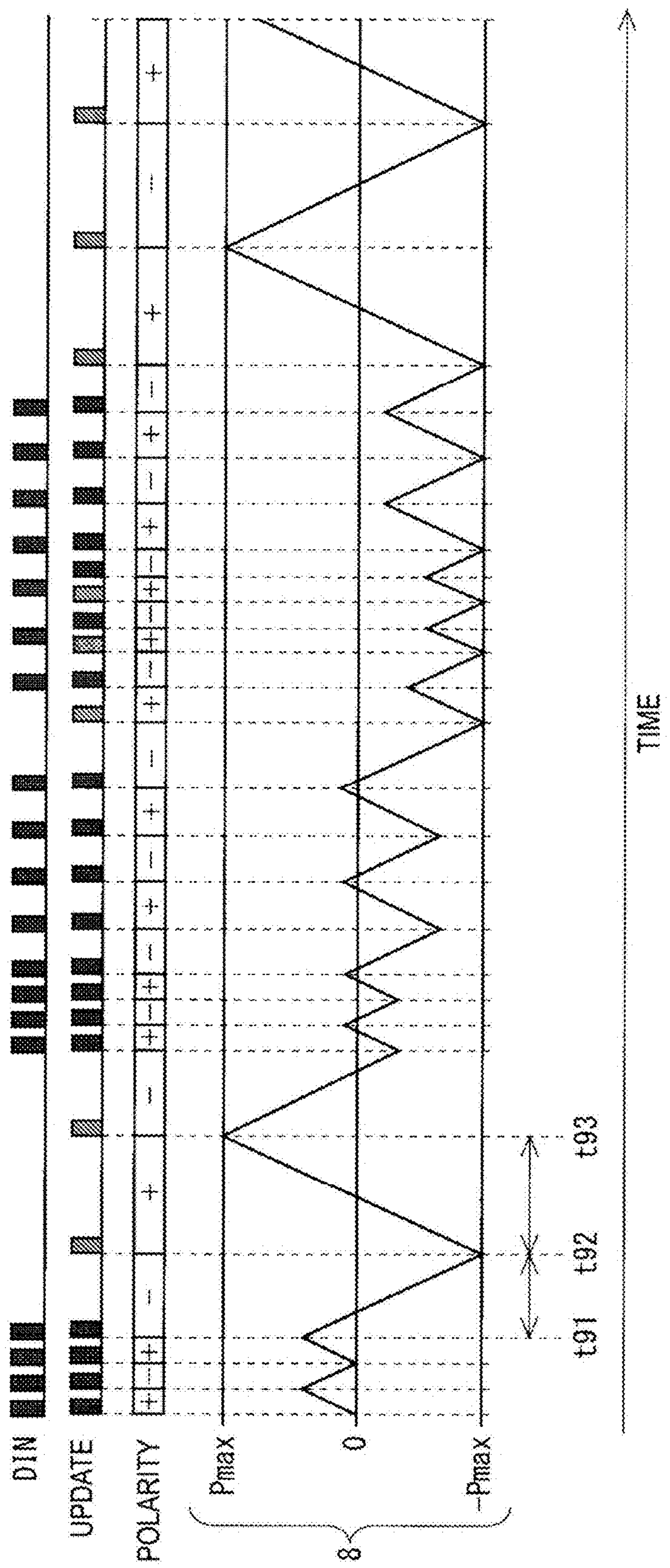
FIG. 13 (Prior Art)
FIG. 13 is a diagram for describing a known method.

When the drive system is switched to the second system, the drive control circuit 100 operates such that the polarity bias value changes in a manner similar to the known method described above (see FIG. 13). At this time, when the polarity bias value reaches an upper limit, the polarity of the data voltage is changed to negative using the image signal DIN stored in the frame memory 170, and a refresh is performed. However, as described above, the polarity here is the polarity of the data voltage in a pixel forming section 4 provided corresponding to an intersection of a gate bus line GL1 and a source bus line SL1, so that, for example, the polarity of a data voltage in the pixel forming section 4 provided corresponding to an intersection of a gate bus line GL2 and the source bus line SL1 is positive. When the polarity bias value reaches a lower limit, the polarity of the data voltage is changed to positive using the image signal DIN stored in the frame memory 170, and a refresh is performed. When the image signal DIN transmitted from the host 2 is input, a refresh is performed so that a data voltage having a polarity opposite to the polarity of the data voltage applied to liquid crystal capacitance 42 during the immediately preceding scan frame period is applied to the liquid crystal capacitance 42.

As described above, when the drive system is switched to the second system, the drive control circuit 100 operates as follows. When the polarity bias value reaches the upper limit, the drive control circuit 100 uses the image signal DIN stored in the frame memory 170 to control the operations of the source driver 300 and the gate driver 200 so that the polarity bias value becomes smaller. When the polarity bias value reaches the lower limit, the drive control circuit 100 uses the image signal DIN stored in the frame memory 170 to control the operations of the source driver 300 and the gate driver 200 so that the polarity bias value becomes larger. During a scan frame period in which the polarity bias value does not reach either the upper limit or the lower limit, the drive control circuit 100 controls the operations of the source driver 300 and the gate driver 200 so that a data voltage having a polarity opposite to the polarity of the data voltage applied to the liquid crystal capacitance 42 during the immediately preceding scan frame period is applied to the liquid crystal capacitance 42.

Figure 11:
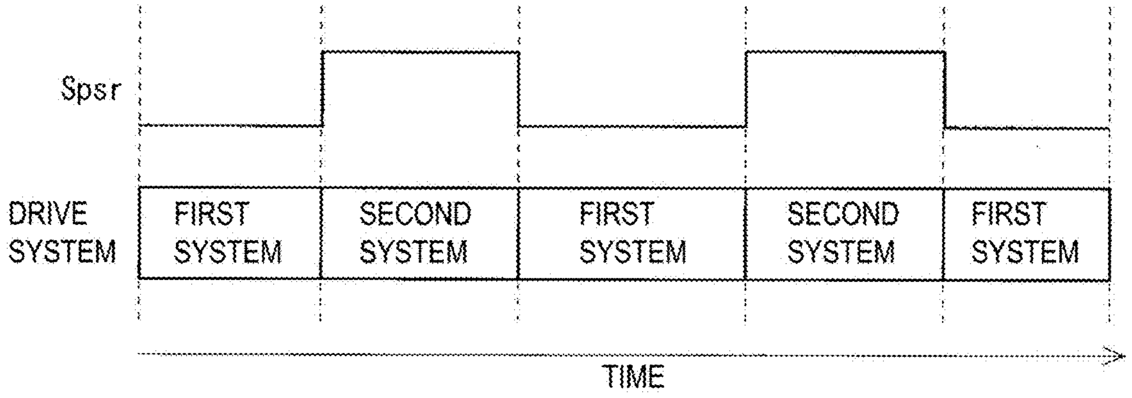
FIG. 11 is a diagram for describing switching of a drive system in the third embodiment.
Figure 12:
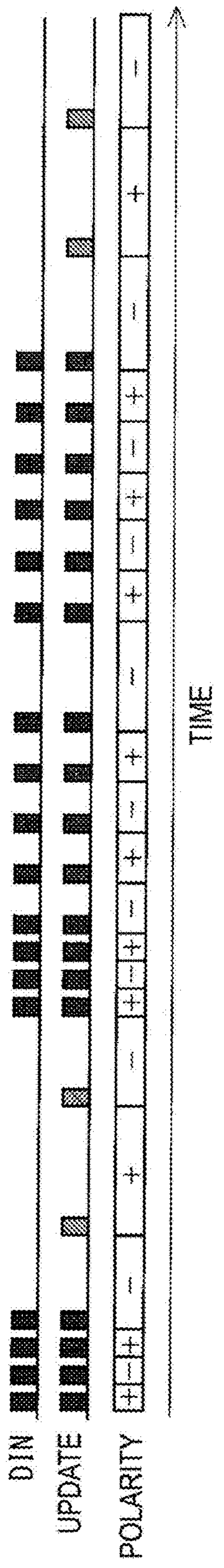
FIG. 12 (Prior Art)
FIG. 12 is a diagram for describing issues related to pause drive.

The drive control circuit 100 switches the operation based on a PSR control signal Spsr transmitted from the host 2. For example, as illustrated in FIG. 11, during a period in which the drive system is to be the first system, a low-level PSR control signal Spsr is transmitted from the host 2 to the liquid crystal display device 1, and during a period in which the drive system is to be the second system, a high-level PSR control signal Spsr is transmitted from the host 2 to the liquid crystal display device 1. During a period in which the PSR control signal Spsr is at a high level, the PSR drive is enabled, and the drive control circuit 100 controls the operations of the source driver 300 and the gate driver 200 using the image signal DIN stored in the frame memory 170. Note that a command for switching the drive system between the first system and the second system may be transmitted from the host 2 to the liquid crystal display device 1 to switch the operation of the drive control circuit 100.

3.4 Effects

According to this embodiment, in a system in which switching is dynamically performed between a system in which the liquid crystal display device 1 is driven synchronously with an input signal and a system in which the liquid crystal display device 1 is driven asynchronously with the input signal, it is possible to reduce power consumption while suppressing deterioration of display quality caused by polarity bias of the data voltage.

4. Others

Although the disclosure has been described in detail above, the above description is exemplary in all respects and is not limited thereto. It is understood that numerous other modifications or variations can be made without departing from the scope of the disclosure.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A liquid crystal display device including a display portion including a plurality of image signal lines, a plurality of scanning signal lines intersecting the plurality of image signal lines, and a plurality of pixel forming sections corresponding to intersections of the plurality of image signal lines and the plurality of scanning signal lines, respectively, the liquid crystal display device provided with (i) a scan frame period during which the plurality of scanning signal lines is selectively driven, in sequence, synchronously with an image signal input from an exterior, and (ii) a pause frame period during which the driving of the plurality of scanning signal lines is paused, the liquid crystal display device further comprising:

an image signal line drive circuit configured to apply a data voltage, corresponding to the image signal, to liquid crystal capacitance, included in each of the plurality of pixel forming sections, by driving each of the plurality of image signal lines;

a scanning signal line drive circuit configured to selectively drive the plurality of scanning signal lines in sequence; and a drive control circuit including a counter configured to count a polarity bias value representing a polarity bias of the data voltage applied to the liquid crystal capacitance, the drive control circuit configured to control operations of the image signal line drive circuit and the scanning signal line drive circuit in accordance with the polarity bias value, wherein:

during a scan frame period, in which the polarity bias value is greater than a predetermined upper limit at a start of an input of one frame of the image signal, the drive control circuit reduces the polarity bias value by controlling the operations of the image signal line drive circuit and the scanning signal line drive circuit, during a scan frame period, in which the polarity bias value is smaller than a predetermined lower limit at the start of the input of the one frame of the image signal, the drive control circuit increases the polarity bias value by controlling the operations of the image signal line drive circuit and the scanning signal line drive circuit, and during a scan frame period, in which the polarity bias value is equal to or greater than the predetermined lower limit and equal to or smaller than the predetermined upper limit at the start of the input of the one frame of the image signal, the drive control circuit applies a first data voltage, having a polarity opposite to a polarity of a second data voltage applied to the liquid crystal capacitance during an immediately preceding scan frame period, to the liquid crystal capacitance by controlling the operations of the image signal line drive circuit and the scanning signal line drive circuit.

2. The liquid crystal display device according to claim 1, wherein the counter counts the polarity bias value throughout the scan frame period and the pause frame period.

3. The liquid crystal display device according to claim 1, wherein the scan frame period includes a vertical blanking period, and the counter counts the polarity bias value throughout the vertical blanking period and the pause frame period.

4. The liquid crystal display device according to claim 1, wherein the drive control circuit further includes an average pixel value calculation circuit configured to calculate an average pixel value that is an average of pixel values of the plurality of pixel forming sections based on the one frame of the image signal, and the counter increases or decreases the polarity bias value by K×C per unit time according to a polarity of the data voltage applied to the liquid crystal capacitance, where K is a coefficient corresponding to the average pixel value and C is a predetermined constant.

5. The liquid crystal display device according to claim 1, wherein the drive control circuit determines whether the polarity bias value is equal to or greater than the predetermined lower limit and equal to or smaller than the predetermined upper limit at the start of the input of the one frame of the image signal based on flag data that is binary data.

6. The liquid crystal display device according to claim 5, wherein the flag data is updated every time the polarity bias value changes based on the changed polarity bias value.

7. The liquid crystal display device according to claim 5, wherein the flag data is updated at the start of the input of the one frame of the image signal based on the polarity bias value.

8. A liquid crystal display device including a display portion including a plurality of image signal lines, a plurality of scanning signal lines intersecting the plurality of image signal lines, and a plurality of pixel forming sections corresponding to intersections of the plurality of image signal lines and the plurality of scanning signal lines, respectively, the liquid crystal display device provided with (i) a scan frame period during which the plurality of scanning signal lines is selectively driven in sequence, and (ii) a pause frame period during which the driving of the plurality of scanning signal lines is paused, the liquid crystal display device further comprising:

an image signal line drive circuit configured to apply a data voltage, corresponding to an image signal input from an exterior, to liquid crystal capacitance, included in each of the plurality of pixel forming sections, by driving each of the plurality of image signal lines;

a scanning signal line drive circuit configured to selectively drive the plurality of scanning signal lines in sequence;

a drive control circuit including a counter configured to count a polarity bias value representing a polarity bias of the data voltage applied to the liquid crystal capacitance, the drive control circuit configured to control operations of the image signal line drive circuit and the scanning signal line drive circuit in accordance with the polarity bias value; and a frame memory configured to store one frame of the image signal, wherein:

a drive system is dynamically switched between a first system in which the plurality of scanning signal lines is driven synchronously with the image signal and a second system in which the plurality of scanning signal lines is driven asynchronously with the image signal, in a case that the drive system is switched to the first system:

during a scan frame period, in which the polarity bias value is greater than a predetermined upper limit at a start of an input of the one frame of the image signal, the drive control circuit reduces the polarity bias value by controlling the operations of the image signal line drive circuit and the scanning signal line drive circuit, during a scan frame period, in which the polarity bias value is smaller than a predetermined lower limit at the start of the input of the one frame of the image signal, the drive control circuit increases the polarity bias value by controlling the operations of the image signal line drive circuit and the scanning signal line drive circuit, and during a scan frame period, in which the polarity bias value is equal to or greater than the predetermined lower limit and equal to or smaller than the predetermined upper limit at the start of the input of the one frame of the image signal, the drive control circuit applies a first data voltage, having a polarity opposite to a polarity of a second data voltage applied to the liquid crystal capacitance during an immediately preceding scan frame period, to the liquid crystal capacitance by controlling the operations of the image signal line drive circuit and the scanning signal line drive circuit, and in a case that the drive system is switched to the second system:

after the polarity bias value reaches the predetermined upper limit, the drive control circuit reduces the polarity bias value by controlling the operations of the image signal line drive circuit and the scanning signal line drive circuit using the image signal stored in the frame memory, after the polarity bias value reaches the predetermined lower limit, the drive control circuit increases the polarity bias value by controlling the operations of the image signal line drive circuit and the scanning signal line drive circuit using the image signal stored in the frame memory, and during a scan frame period in which the polarity bias value does not reach either the predetermined upper limit or the predetermined lower limit, the drive control circuit applies a third data voltage, having a polarity opposite to a polarity of a fourth data voltage applied to the liquid crystal capacitance during an immediately preceding scan frame period, to the liquid crystal capacitance by controlling the operations of the image signal line drive circuit and the scanning signal line drive circuit.

9. A method of driving a liquid crystal display device provided with (i) a scan frame period during which a plurality of scanning signal lines is selectively driven, in sequence, synchronously with an image signal input from an exterior, and (ii) a pause frame period during which the driving of the plurality of scanning signal lines is paused, the liquid crystal display device including:

a display portion including a plurality of image signal lines, the plurality of scanning signal lines intersecting the plurality of image signal lines, and a plurality of pixel forming sections corresponding to intersections of the plurality of image signal lines and the plurality of scanning signal lines, respectively, an image signal line drive circuit configured to apply a data voltage, corresponding to the image signal, to liquid crystal capacitance, included in each of the plurality of pixel forming sections, by driving each of the plurality of image signal lines, and a scanning signal line drive circuit configured to selectively drive the plurality of scanning signal lines in sequence, the method comprising:

counting a polarity bias value representing a polarity bias of the data voltage applied to the liquid crystal capacitance; and controlling operations of the image signal line drive circuit and the scanning signal line drive circuit in accordance with the polarity bias value during the scan frame period, wherein:

during a scan frame period, in which the polarity bias value is greater than a predetermined upper limit at a start of an input of one frame of the image signal, the polarity bias value is reduced by controlling the operations of the image signal line drive circuit and the scanning signal line drive circuit, during a scan frame period, in which the polarity bias value is smaller than a predetermined lower limit at the start of the input of the one frame of the image signal, the polarity bias value is increased by controlling the operations of the image signal line drive circuit and the scanning signal line drive circuit, and during a scan frame period, in which the polarity bias value is equal to or greater than the predetermined lower limit and equal to or smaller than the predetermined upper limit at the start of the input of the one frame of the image signal, a first data voltage, having a polarity opposite to a polarity of a second data voltage applied to the liquid crystal capacitance during an immediately preceding scan frame period, is applied to the liquid crystal capacitance by controlling the operations of the image signal line drive circuit and the scanning signal line drive circuit.

* * * * *